United States Patent [19]
Collyer

[11] Patent Number: 5,931,419
[45] Date of Patent: Aug. 3, 1999

[54] REDUCING SATELLITE WEIGHT AND COST

[75] Inventor: Gordon L. Collyer, Clearwater, Fla.

[73] Assignee: Honeywell Inc., Minneapolis, Minn.

[21] Appl. No.: 08/908,352

[22] Filed: Aug. 7, 1997

[51] Int. Cl.⁶ .................................................. B64G 1/00
[52] U.S. Cl. ................... 244/158 R; 244/164; 244/169; 244/172
[58] Field of Search ................ 244/164, 158 R, 244/169, 171, 172

[56] References Cited

U.S. PATENT DOCUMENTS

| | | | |
|---|---|---|---|
| 3,380,687 | 4/1968 | Wrench et al. | 244/158 R |
| 3,420,470 | 1/1969 | Meyer | 244/158 R |
| 5,199,672 | 4/1993 | King et al. | 244/164 |
| 5,242,135 | 9/1993 | Scott | 244/164 |
| 5,411,226 | 5/1995 | Jones et al. | 244/158 R |
| 5,605,308 | 2/1997 | Quan et al. | 244/158 R |
| 5,613,653 | 3/1997 | Bombled et al. | 244/158 R |
| 5,884,866 | 3/1999 | Steinmeyer et al. | 244/158 R |

*Primary Examiner*—J. Woodrow Eldred
*Attorney, Agent, or Firm*—Robert E. Greenstien

[57] ABSTRACT

Satellites are launched to a first orbit on a launch rocket. The satellites are connected together, forming a satellite cluster, that is propelled from the first orbit to a higher mission orbit by thrustors on each satellite. The satellite cluster is formed so that satellite cluster rotation from aerodynamic drag on the individual satellites is minimized. The thrustors are sequenced to control satellite cluster attitude during the transition to the second altitude. At the second altitude, the satellites are separated from the satellite cluster and propelled to their mission orbits using their own thrustors and attitude system.

8 Claims, 2 Drawing Sheets

REDUCING SATELLITE WEIGHT AND COST

TECHNICAL FIELD

This invention relates techniques for launching satellites, in particular, reducing satellite weight and cost.

BACKGROUND OF THE INVENTION

Following conventional techniques, a group of satellites can be launched on a single rocket and each satellite individually inserted into its "mission" orbit. Typically, each satellite contains attitude adjustment or control devices, such as a collection of controlled momentum devices, reaction wheels or thrustors, to adjust the pitch, yaw and roll of the satellite relative to the earth and or sun to position solar panels and antenna in the mission orbit and during orbit insertion.

During a typical insertion, the satellites are individually deployed from the upper rocket (i.e., launch vehicle) when it reaches a specific orbit (initial altitude) where there is a thin atmosphere. Satellite thrusters propel each satellite to the mission orbit (second, higher altitude), the attitude system operating during that stage to maintain a correct attitude for antennas and solar panels. Aerodynamic drag on external surfaces, such as solar panels, produce satellite rotation that must be counteracted to maintain a desired attitude. Because the aerodynamic forces are considerably greater than the forces needed to maintain proper satellite attitude at its mission orbit, the attitude control system (e.g., momentum gyros) is more complex and powerful than needed at the mission orbit. In other words, simply to deal with drag during orbit insertion the satellite's attitude control system is overdesigned. Launch cost per satellite is a significant factor in the price of seeding a "constellation" of satellites. Reducing satellite complexity simply translates to more satellites per launch, substantially reducing that price.

DISCLOSURE OF THE INVENTION

An object of the present invention is to launch more lower weight and cost satellites on a single launch rocket (vehicle).

According to the invention, a group of satellites are attached to each other as a "satellite cluster" of satellites that is propelled from a launch rocket into the mission orbit. Each satellite has thrusters and its own attitude control (such as attitude thrustors or momentum devices) which are used only when the satellite is separated from the satellite cluster. Coordinated operation of thrustors on the coupled satellites performs the orbit insertion and controls the satellite cluster attitude. The satellites are coupled so that the aerodynamic drag for the components on each satellite balance to reduce the drag forces that rotate the satellite cluster, reducing the power required to control attitude during orbit insertion. Once the mission orbit is reached, the satellites separate (leave the satellite cluster) under the control of their individual thrustors and attitude control devices for final deployment at the mission orbit.

A feature of the invention is that it allows the satellite attitude system to be "sized" solely for the needs at the mission orbit, which reduces the size, weight, power and cost, depending upon the particular attitude system (e.g., momentum devices, thrustors) that is selected.

Other objects, benefits and features will become more apparent in light of the following discussion of the invention.

BEST MODE FOR CARRYING OUT THE INVENTION

For the purpose of this discussion, the exemplary attitude system for each satellite comprises a momentum device, such as a CMG, perhaps the most common attitude control device. Nevertheless, it should be understood that other conventional attitude control devices, such as thrusters, may be used in place of the CMGs on the satellite to change yaw, pitch and roll (attitude). Regardless of the type of device, the invention makes it possible to "scale down" those devices to the reduced attitude control needs at the mission orbit.

Figure 1:
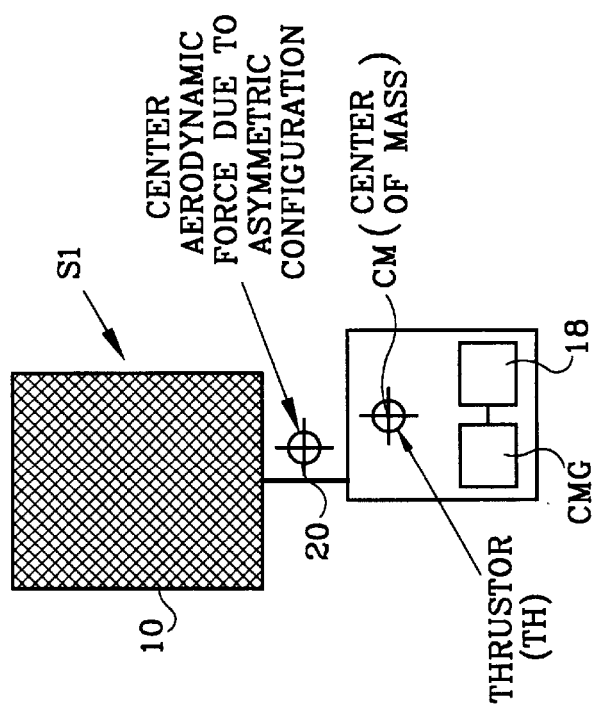
FIG. 1 shows a single satellite with a solar panel and thrustor.
Figure 3:
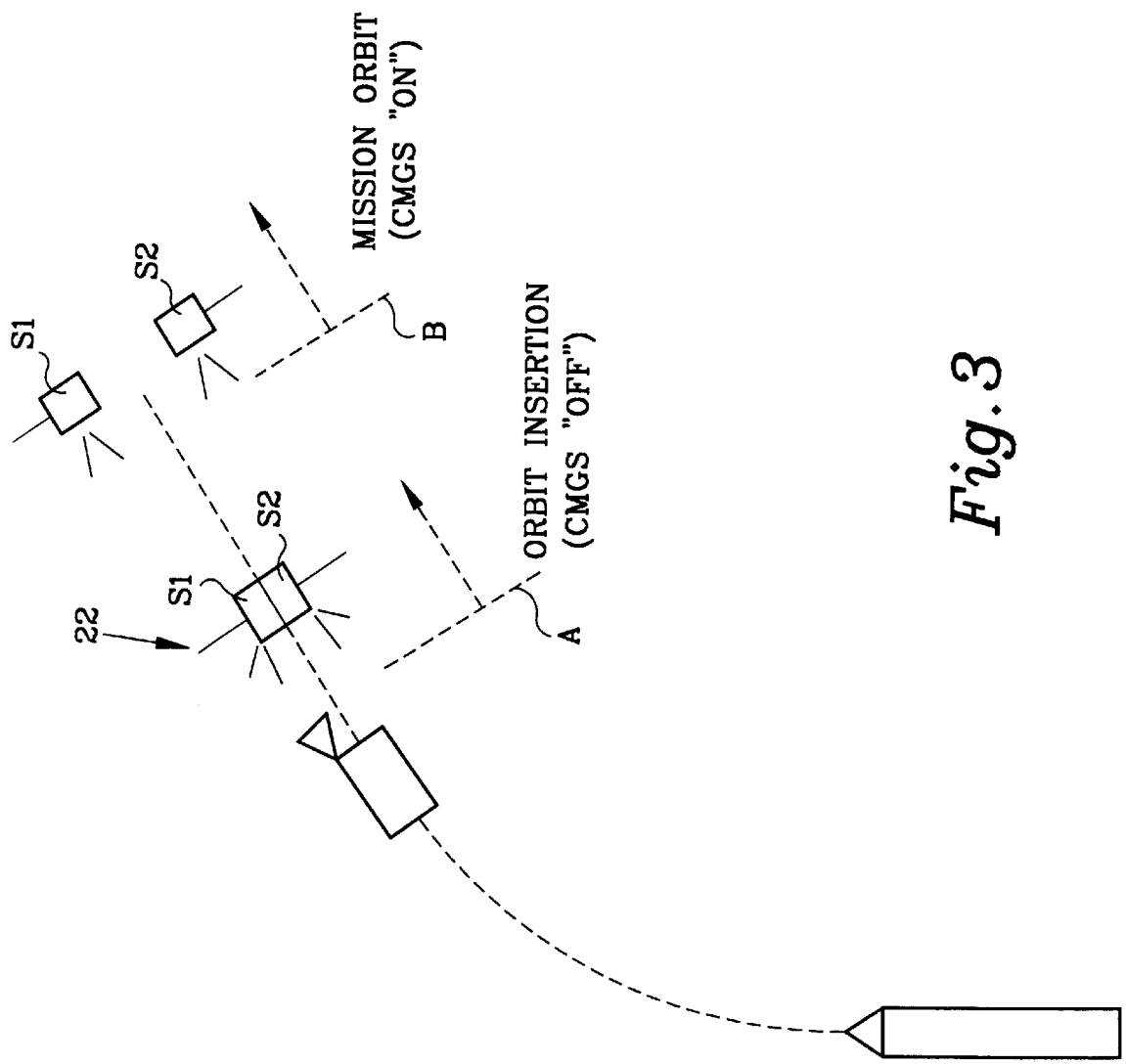
FIG. 3 shows a satellite launch sequence according to the present invention.

The satellite S1 in FIG. 1 includes a solar panel 10 and an attitude system, in this case a controlled momentum gyro CMG to control the spherical attitude of the satellite S1. In an actual launch, several of these satellites would be released from a launch vehicle at an initial altitude (A in FIG. 3), where each satellite is independently inserted into the mission orbit (B in FIG. 3) by its own thrusters. The location of the satellite's center of mass is at CM, where a thrustor TH is located. The thrustor TH is fired to propel the satellite S1 and the attitude of the satellite S1 is controlled by the CMG motion, which is controlled by an attitude control 18. The solar panel 10 produces aerodynamic drag, effectively at point 20, particularly at lower earth orbits where orbit insertion begins. That creates satellite rotation. The CMGs are shifted to counteract that rotation so that the satellite velocity and attitude are correct. The rotational forces from the aerodynamic drag can be substantial at the initial or insertion attitude. At that altitude, the the possible forces required to reorient the satellite are much greater than those at the mission orbit, where the atmosphere is thinner and orbital velocities are lower. FIG. 1 typifies current launch approaches: the momentum devices, CMGs or reaction wheels, are larger than needed simply to have the capacity (stored angular momentum) to counteract rotation from aerodynamic drag on the satellite surfaces during the orbit insertion. The same would be true if the satellite did not use CMGs, but instead used only thrustors to adjust pitch, yaw and roll. Consequently, at its mission orbit, this satellite has substantial excess attitude control capacity because it needs less "control authority" or "capacity".

Figure 2:
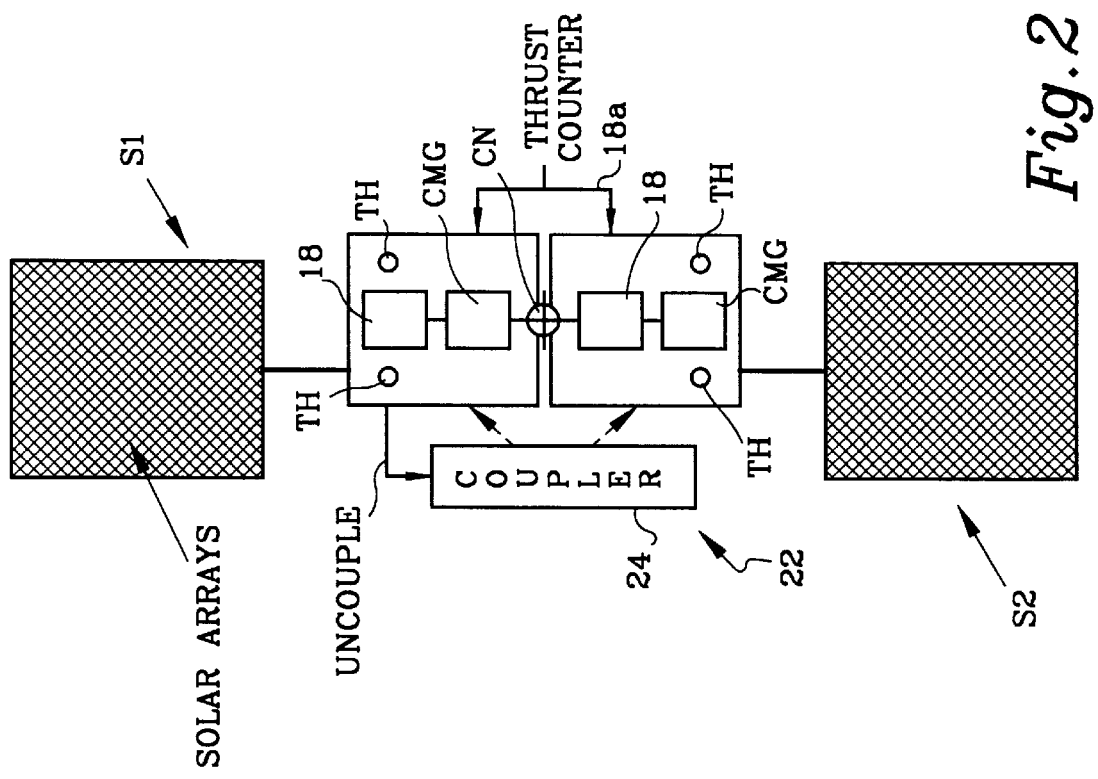
FIG. 2 shows a satellite cluster embodying the present invention.

FIG. 2 illustrates a cluster of satellites 22 embodying the present invention. For convenience two satellites S1, S2 are shown, but more than that can comprise a satellite cluster. The satellite cluster 22 is launched to an initial attitude on a launch rocket, and from that point, it is propelled to the mission orbit (a second higher altitude) by thrustors TH on satellites. (See FIG. 3.) As with FIG. 1, each satellite has a CMG controlled by an attitude system 18. The attitude system thrust and attitude controls communicate over a link 18a. The satellites S1 and S2 are mechanically joined by a coupling mechanism 24, which uncouples them on a command, (e.g. from one of the attitude controls 18a or a ground based signal) at the mission orbit. The coupling mechanism 24 is meant to illustrate that the satellites in the satellite cluster are detachable. The coupling mechanism 24 may be explosive bolts or some other controllable, quick release devices applicable to the space environment and remote, autonomous operation. At the mission altitude, the motion and attitude satellite S1, S2 is controlled by its individual thrustor TH and CMG. Each satellite has two thrustors TH which are equidistant or symmetrical around the center of mass. Thrustor firing to establish proper satellite attitude may be controlled by the attitude controls 18 based on earth or sun sensors. The CMGs may be powered down or used for minor rotations during orbit insertion under the thrustors TH, which in concert control the attitude of the satellite cluster. The CMGs required for the individual satellites S1, S2 in the satellite cluster 22 therefore are smaller and lighter than for the satellite S1 shown in FIG. 1. More satellites can be included on a single launch rocket. The satellite cluster 22 can include more satellites with some or all of them having thrustors to control rotation. Assuming every satellite contains thrustors for orbit adjustment, some of the thrustors do not have to be used during the insertion process. It is also possible to release some satellites from the satellite cluster during the insertion mode, the remaining satellites and thrustors controlling satellite cluster attitude until all the satellites are released. As explained before, the same cost, power, size and weight reductions for the thrusters or any other device used to control attitude during orbital insertion will be possible in an application of the present invention.

With the benefit of the previous discussion of the invention, one of ordinary skill in the may be able to modify the invention, and the functions and functional elements described above, in whole or in part without departing from the true scope and spirit of the invention.

I claim:

1. A method, characterized by:

mechanically attaching a plurality of satellites, each satellite comprising an attitude system and at least one thrustor, to form a satellite cluster;

launching the satellite cluster with a rocket to a first orbit;

propelling the satellite cluster from the first orbit to a second, higher orbit and controlling thrustors on the satellites to maintain a desired attitude for the satellite cluster between the first and second orbits;

releasing the satellites from the satellite cluster at the second orbit; and inserting each satellite to its mission orbit by using said one thrustor and by controlling satellite attitude with said attitude system.

2. The method described in claim 1, further characterized by:

forming the cluster so that aerodynamic drag forces from components on the satellites in the satellite cluster exert opposing moments around the center of rotation for the satellite cluster.

3. The method described in claim 1, further characterized by:

selecting an attitude system for each satellite that is sufficient to control satellite attitude only at the mission orbit.

4. A combination, characterized by:

a plurality of satellites;

means for attaching the satellites to each other to form a satellite cluster and for releasing the satellites from each other on command;

a thrustor on each satellite;

means for controlling the operation of thrustors on the satellites to control the attitude and velocity of the satellite cluster to move the satellite cluster from a first orbit to a second orbit;

attitude control means on each satellite for controlling satellite attitude;

means for controlling a thrustor on each satellite to propel the satellite to the second orbit when the satellite is released from the satellite cluster; and means for operating said attitude control means when a satellite is released from the satellite cluster.

5. The combination described in claim 4, further characterized in that:

the satellite cluster comprises first aerodynamic drag producing components on a first satellite and second aerodynamic drag producing components on a second satellite and the first and second satellites are located in the satellite cluster so that the first and second components create counteracting moments on the satellite cluster.

6. The combination described in claim 4, further characterized by:

the attitude control means comprising means for controlling attitude only at or above the second orbit.

7. A method, characterized by:

deploying a satellite cluster comprising a plurality of attached satellites from a first orbit to a second orbit using thrusters on the satellites to control the attitude of the satellite cluster;

arranging the satellites in the satellite cluster to minimize aerodynamic rotating forces on the satellite cluster;

detaching a first satellite from the plurality of satellites at a second orbit; and inserting the first satellite into its mission orbit, above the first orbit, and controlling the attitude of the first satellite with an attitude control system on the satellite that is sufficient to control the attitude only at the mission orbit.

8. A method, characterized by:

deploying attached satellites in a first orbit in which aerodynamic forces on the satellites, if detached, would exceed the capacity of the attitude system on each satellite;

controlling thrusters on the satellites while they are attached to move the satellites to a first orbit while controlling the attitude of the attached satellites with the thrusters;

detaching the satellites at a second orbit at which the attitude system on each satellite is capable of overcoming the aerodynamic forces on the satellite.

* * * * *